3,375,706
ULTRASONIC FLAW DETECTING SYSTEM

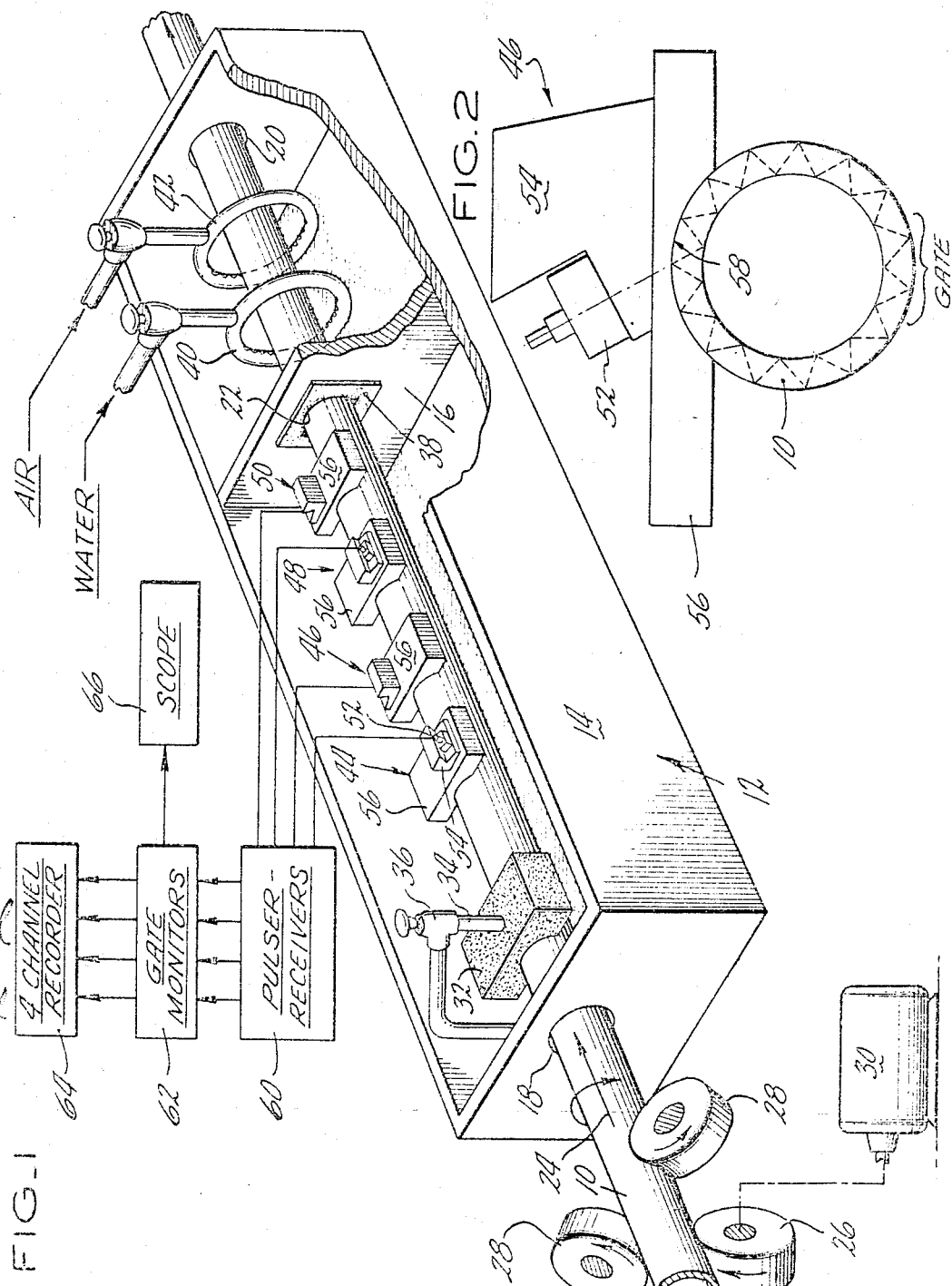

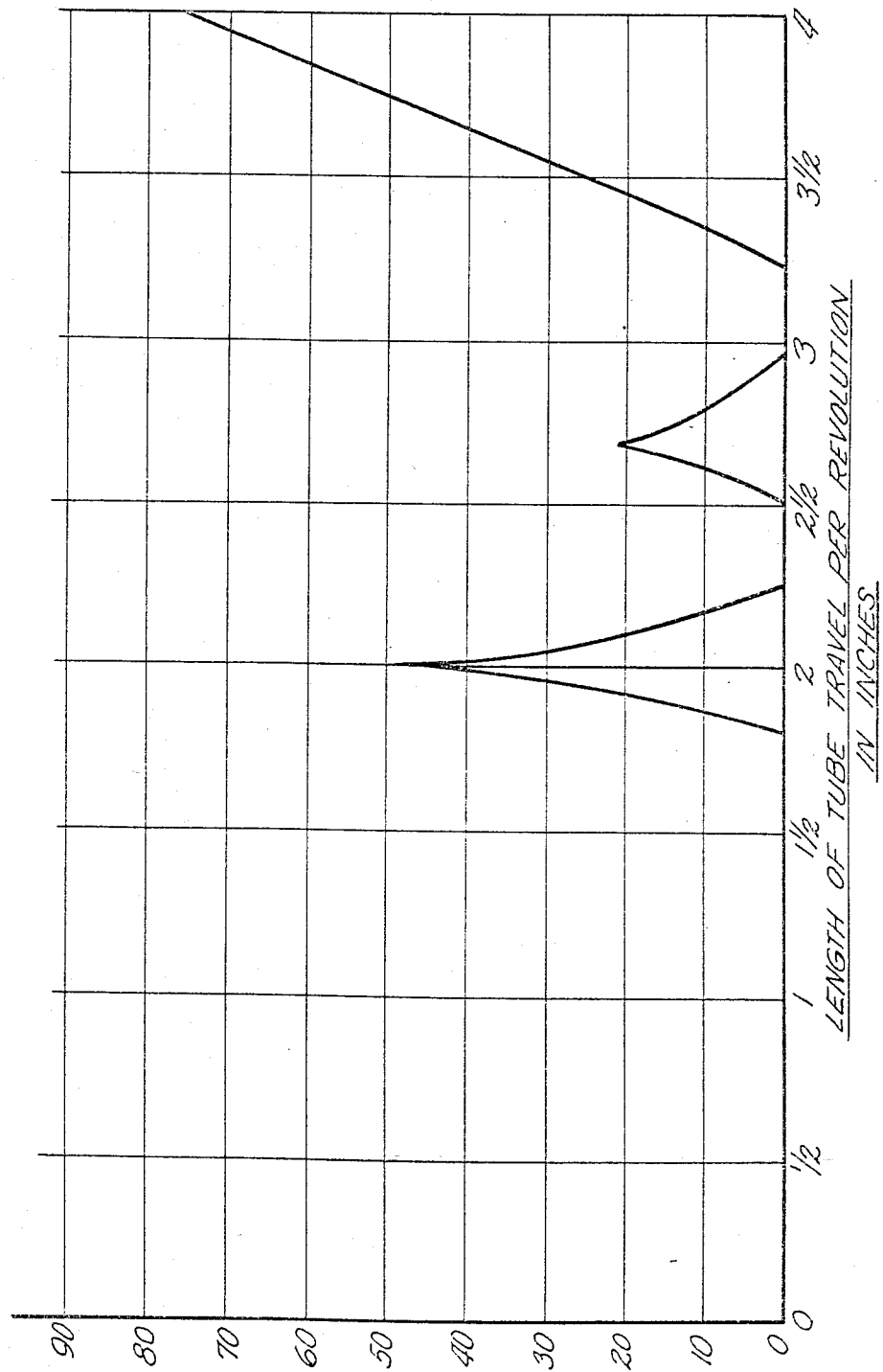

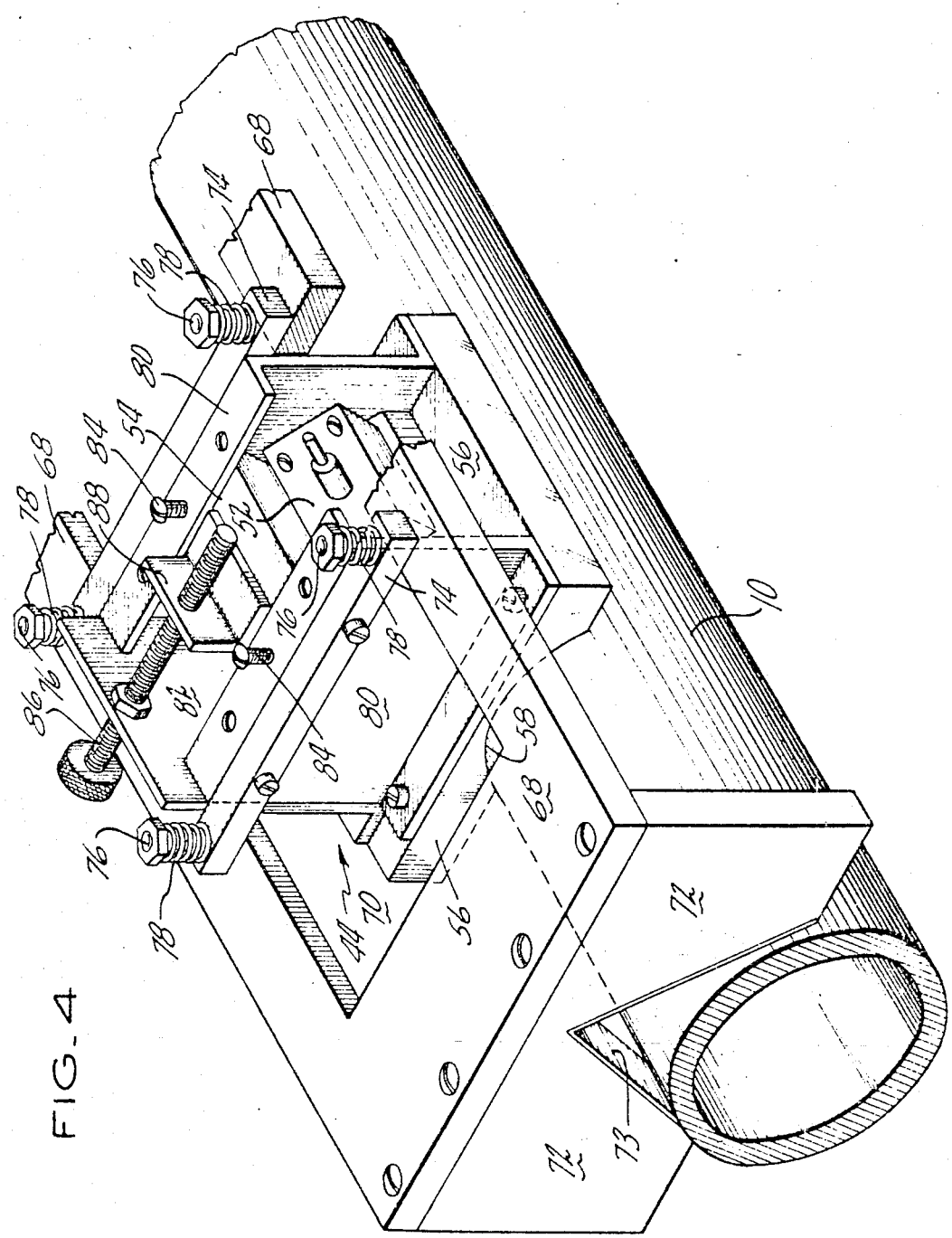

Charles R. Pandelis, Hixson, William L. Dearing, Jr., Chattanooga, and Franklin E. Misner, Hixson, Tenn., assignors to Combustion Engineering, Inc., Windsor, Conn., a corporation of Delaware
Filed Dec. 28, 1964, Ser. No. 421,266
9 Claims. (Cl. 73—67.9)

ABSTRACT OF THE DISCLOSURE

Ultrasonic flaw detecting apparatus and method wherein a plurality of ultrasonic transducers are located in-line and at spaced intervals along the path of travel of a rotating article to be inspected. The spacing of the transducers and the rate of travel and rotation of the article are coordinated whereby the transducers each scan a separate helical portion of the article.

---

The use of ultrasonic techniques for the testing of materials for the presence of flaws or defects is well known. An ultrasonic transducer normally consisting of a piezoelectric crystal is coupled by one of a variety of methods to the specimen to be tested and the transducer is then electrically excited to send ultrasonic pulses or sound waves into the specimen. If there are flaws present the ultrasonic wave will be reflected and the reflected wave will be detected by either the same or another transducer element. In testing elongated specimens it is common to pass the specimen progressively through a testing station. In the case of cylindrically shaped objects, this is often accomplished by rotating the object to check one portion with a single fixed crystal and then advancing the object to check another portion. This technique is, however, quite slow, since the single transducer must traverse and search the entire specimen.

Another problem inherent in currently employed ultrasonic testing techniques is that certain defects can go undetected or at least the magnitude of the defect is not appreciated. This is due to the fact that defects may be so oriented within the material being tested with respect to the direction of propagation of the ultrasonic wave through the material that there will be little or no reflection from the defect. A wave striking this same defect from some other angle on the other hand might produce a reflection signal of such magnitude as to cause rejection of the material.

The present invention overcomes the undesirable features of the prior systems as mentioned above and provides for more rapid and thorough testing. This is accomplished by utilizing a plurality of ultrasonic search units arranged in a particular manner with respect to the path of travel of the specimen to be tested connected so as to trigger an alarm and give an indication when a defect larger than permissible is detected.

It is therefore an object of the present invention to provide a novel ultrasonic testing scheme.

Another object of the invention is to increase the speed of testing elongated specimens for the presence of flaws therein.

A further object of the invention is to provide an automatic testing technique which will more readily detect oriented defects and at the same time increase the speed of testing.

The present invention, as previously stated, incorporates a multiplicity of ultrasonic transducers spaced at intervals along the path of travel of the specimen to be tested. The elongated specimen being tested is rotated as it is advanced past the transducer units and the spacing of the transducers, the speed of travel of the specimen and the rate of rotation of the specimen are all coordinated so that each transducer will be effective to search a substantially different portion of the specimen than the other units. In this manner the specimen may be advanced at a more rapid rate since each unit only has a portion of the material to cover rather than the entire specimen. Furthermore, the units are arranged in such a manner that oriented defects will be more readily detected.

For a better understanding of the invention reference may be had to the accompanying drawings wherein:

FIG. 1 is a simplified prospective view of an embodiment of the testing device of the present invention which also diagrammatically illustrates the associated ultrasonic operating apparatus;

FIG. 2 is a section view of a tube being tested illustrating the transducer mounting and wave pattern;

FIG. 3 is a graph illustrating the permissible rate of travel of the specimen per revolution for a particular transducer spacing; and FIG. 4 is a perspective view of a portion of the transducer mounting arrangement.

Referring now to the drawings and more particularly to FIG. 1, there is shown a specimen 10, in this case a tube, being inspected in the test apparatus which is generally designated 12. This apparatus comprises an elongated tank 14 which is divided into two portions by dividing wall 16. Openings 18 and 20 are provided through each end of the tank 14 and there is a similar opening 22 through dividing wall 16. The specimen 10 passes through the tank 14 via openings 18, 20 and 22 and travels in the direction indicated by arrow 24.

The pipe specimen 10 rests on roller 26 and is held in line by the side rollers 28. The roller 26 is driven by motor 30 although any sort of drive means would be suitable. Roller 26 is mounted so that it can be rotated about a vertical axis so as to change the angle of the roller with respect to the specimen 10. This angular placement will cause the specimen to be advanced as it is rotated and a change in the angle will adjust the amount of advance of the specimen per revolution. The rollers 28 are also adjustable about horizontal axis so that they may be set to ride on the specimen without any slippage. Such conveying equipment is commercially available and the specific details thereof form no part of the present invention.

As the specimen enters the first portion of the tank through opening 18, it engages a sponge 32 which rests on the top of the specimen and is resiliently held in place by suitable means. The sponge is supplied with a glycerin-water solution from tube 34 which is for the the purpose of providing a liquid couple between the specimen and the transducer element. There is a reserve of this solution in the bottom of the first portion of tank 14 and a pump (not shown) circulates this solution through the tube 34. Valve 36 is utilized to control the flow of solution. A flexible scraper element or squeegee 38 is placed around the tube just prior to where it enters opening 22 for the purpose of scraping and removing as much of the glycerin-water solution from the tube as possible prior to leaving the first portion of tank 14 and entering the second portion of the tank. The solution removed at this point will merely run down into the bottom of the first portion of the tank.

An alternate arrangement for wetting the specimens to obtain the proper couple is to divide the tank 14 into three portions instead of the two illustrated. In this case the third portion is comparatively small and at the initial part of tank 14 where the test specimen enters the tank. A spray ring is provided in this initial chamber for the purpose of spraying the specimen with pure water rather than with a water-glycerin mixture. This water will rapidly penetrate any rust present on the specimens and completely wet the surface. A sponge may be employed with this pre-wetter, but it is not necessary. The excess water is removed from the specimen prior to leaving this additional tank portion by means of a squeegee similar to squeegee 38. This will leave water only in the pores of rust plus a light film over the entire surface. After leaving this additional tank portion, pure glycerin is applied to the specimen from tube 34 instead of the glycerin-water mixture. This will give better lubrication and increase the life of the wear shoes hereinafter discussed.

After passing through opening 22 the specimen passes through a spray ring 40 where the specimen is flushed with water to remove any residual glycerin. The specimen then passes through a similar ring 42 which is supplied with air under pressure to remove residual water and dry the specimen.

The ultrasonic test units 44, 46, 48 and 50 are located along the path of travel of the specimen in the first portion of the tank subsequent to contact with the sponge 32. The crysal units themselves, 52, are mounted on conventional "Plexiglas" 45° shear wave wedge blocks, 54, as shown in FIGS. 1 and 2. The wedges are in turn mounted on wear shoes 56 and coupled to the wear shoes by means of a material such as grease. The wear shoes are contoured at 58 to conform to the specimen and the shoes are coupled to the specimen by means of the glycerin and water solution. The specific mounting means for the test units as shown in FIG. 4 will be explained hereinafter. The electrical energy is supplied to the transducers from the pulser-receivers 60 and these same units also receive the flaw indicating signals back from the transducers.

The dotted zig-zagged line shown in the cross section of the test specimen 10 in FIG. 2 illustrates the centerline of the path of the shear wave around the pipe. As can be seen, the shear wave in a sense ricochets off the inner and outer pipe walls as it travels around. While a line is used in this diagram to illustrate the sound path, the path in reality is a continuously diverging beam and the dotted line merely represents the centerline of such a beam. As the beam progresses around the tube it will decrease in intensity per unit cross section due to this divergence and also to attenuation. For further explanation of the use of shear wave techniques in ultrasonic testing, reference may be had to an article entitled "Ultrasonic Flaw Detection in Pipes by Means of Shear Waves," appearing in the April 1951 issue of The Transactions of the ASME on pages 225–235. It can be seen, therefore, that the strength of the returned signal from a defect will depend upon the distance of the defect around the circumference from the source. In order that the apparatus may be calibrated so that a defect of a predetermined magnitude will give the proper indication and cause the tube to be rejected, only a portion of the returned signals from defects is considered, as will be explained hereinafter. This is illustrated in FIG. 2 by the labeled gate at the lower portion of the specimen 10. Only flaw signals from this small portion of the tube are fed to the alarm and recording apparatus. This is accomplished by the use of gate monitors 62 which electrically select a portion of the return signals from the transducers for transmission to the recording apparatus 64. Apparatus is commercially available for such a setup such as the UM–721 Sperry Reflectoscope, equipped with four pulser-receivers and four transigates (transistorized gate monitors). Also provided is a cathode ray tube apparatus 66 which may be selectively connected to any one of the plurality of gate monitors to visually observe the return signals from the transducers. This scope is particularly useful along with the recorder for calibrating the apparatus.

As the specimen is moved longitudinally through the test apparatus, it is, as explained hereinbefore, rotated at a predetermined rate since each of the transducers inspects only the portion of the tube circumference, that is, the portion within the area of the gate. It can be seen that each of these transducers will be inspecting tube portions which transcribe a helical path around the tube. The number of transducer units, the spacing of these units and the length of tube travel per tube revolution must all be coordinated so that the plurality of transducers will in combination cover 100 percent of the tube surface. FIG. 3 illustrates the relationship between the length of tube travel per tube revolution relative to the percent of tube area not inspected for a 4-inch crystal spacing. For instance, when the tube is fed 2 inches for each revolution of the tube, only 50 percent of the tube would be covered by the transducers whereas the entire tube surface would be covered if the length of travel were 3 inches per revolution. Similar calibrations would have to be derived for each crystal spacing employed and for various rates of travel. A limiting factor for the rate of tube travel is the requirement that the wear shoes remain in contact with the tube. Therefore, the roughness of the outer surface of the tubes would have a direct bearing on the permissible rate. Tubes have been run through such an apparatus at the rate of 55 feet per minute.

Before running test specimens through the apparatus it is necessary to calibrate so that the signals fed to the recorder and alarm system will accurately and automatically indicate a defect of a size greater than a predetermined set limit. This calibration is carried out by both adjusting the crystal position with respect to the test specimen and by adjusting the magnitude of the output signal from the receiver. For purposes of this calibration a piece of the tubing of the type to be inspected is selected as a standard. This standard has notches cut in both the inside and outside surface to simulate defects. These are normally 5 percent notches (5 percent of the wall thickness) which are cut by means of conventional commercially available arc cutting apparatus. This standard specimen is then placed in the testing apparatus and the inside and outside notches are alternately placed in the gate area of a particular transducer. The wedge block 54 for that transducer is moved back and forth (to the right or left as viewed in FIG. 2) on the wear shoe 56 until a position is reached at which the signals received from the inside and outside notches are equal in magnitude. By such a procedure the signal received from defects anywhere within the thickness of the pipe will be relatively equal. After this is accomplished the magnitude of the signal from these calibration notches is merely adjusted to a preselected value by adjusting the gain of the amplifiers in the pulser-receivers. This procedure is followed for each of the plurality of transducer elements in the testing apparatus and they are each adjusted to give the same magnitude signal for the calibration notches.

FIG. 4 illustrates a portion of an illustrative mounting for one of the transducer elements. This apparatus comprises a mounting plate 68 which has a central cut out portion 70 long enough to accommodate the plurality of transducer elements, in this case four. On each end of the mounting plate are attached two blocks 72 which form a central V-shaped cut out. The inclined edges 73 of the V-shaped cut out are lined with a material such as "Teflon." These coated surfaces will rest on the test specimen and support the test apparatus thereon. Extending across the opening 70 are a pair of support bars 74 for each transducer element. These bars are vertically slideable on pins 76 and forced downwardly by spring means 78. This spring loaded arrangement will permit the wear shoes to move up and down and thus conform to irregularities in the specimens being tested and maintain the necessary couple. Attached to each of the support bars 74 are two side plates 80. The wear shoes 56 are attached to the bottom of these side plates 80. Also attached to the wear shoe is an end plate 82. The wedge block 54 rests between the side plates 80 on the top of the wear shoe 56. As previously stated, a material such as grease provides a suitable couple between the wedge block and the wear shoe. Screw means 84 extend through the inwardly extending upper lips of side plates 80 and bear down on the top of the wedge block to hold it firmly against the wear shoe. A plurality of holes in this upper lip are provided for the screws 84 to accommodate the wedge block in any of its positions. Adjusting screw 86 extends through the end plate 82 and is attached to the top of the wedge block 54 by suitable means 88. This adjusting screw permits the wedge block to be moved back and forth to calibrate the transducer as hereinbefore explained. This mounting means is, of course, illustrative only and any means may be used which maintains the necessary crystal spacing and wear shoe contact with the tubes.

As noted in FIG. 1, the transducer unit 44 has the crystal oriented so that the ultrasonic waves will progress around the tube in one direction whereas the suceeding unit 46 has the transducer element oriented in the opposite direction so that the waves will progress around the tube in the opposite direction. Unit 48 is once again oriented as unit 44 while unit 50 is oriented as unit 46. With the units arranged in this manner and with an appropriate crystal spacing and tube advance per revolution, alternate helical bands of the tube will be inspected in opposite directions. Since certain defects, as previously pointed out, will give greater or lesser return signals depending upon their orientation, the arrangement of the crystals in this manner will greatly increase the possibility of accurately detecting all the defects. For instance, if a defect extends into two adjacent helical paths and the defect is unfavorably oriented for one of the paths, it will be satisfactorily detected by the adjacent transducer unit.

Suitable crystals for this testing apparatus would be ½" x 1" type ZSL Branson crystals with a frequency of 2.25 mc. The 1" dimension extends along the length of the test specimen and with these crystals spaced 4" apart and with a tube travel of 3⅛" per revolution of the tube, 100 percent of the tube will be inspected and in fact there will be some overlap of the helical paths. This overlap will provide an even greater certainty of detecting oriented defects. Besides being able to detect oriented defects, the arrangement whereby the crystals are adjusted to give uniform signals from both inside and outside defects also lends the apparatus to the detection of eccentricity of the inside diameter of the tubes. Such eccentricity will produce an alarm signal just as would a defect in the material.

While one preferred embodiment of the invention has been shown and described, it will be understood that such showing is illustrative rather than restrictive and that changes in construction and arrangement of parts and steps may be made without departing from the spirit and scope of the invention as claimed.

We claim:

1. Apparatus for ultrasonically inspecting elongated cylindrical specimens comprising means for advancing said specimens lengthwise along a path of travel at a preselected rate, means for rotating said specimens at a preselected rate as they are advanced, a plurality of ultrasonic search units spaced along said path of travel, means for supplying flaw-probing energy to said ultrasonic search units and means for receiving and indicating flaw-revealing signals from said ultrasonic search units, said receiving means including means to separate portions of said flaw-revealing signals for indication representing predetermined portions of said specimens, said spacing between adjacent ultrasonic search units and the preselected rate of advancement and rotation of each of said specimens being such that each of said ultrasonic search units inspects substantially separate helical paths each extending the length of said specimens and such that the convolutions of each said helical path are intermediate the convolutions of the other of said helical paths in such a manner that the entire specimen is inspected, said ultrasonic search units being arranged at an angle to the surface of said specimens such that the ultrasonic pulses are propagated as shear waves around said specimens, at least one of said ultrasonic search units being arranged to propagate the waves around the specimen in one direction and at least another of said ultrasonic search units arranged to propagate the waves around the specimens in the opposite direction.

2. Apparatus for inspecting elongated cylindrical specimens comprising a plurality of ultrasonic transducers spaced apart in a generally straight line, means for effecting relative movement in said straight line between said specimens and said ultrasonic transducer at a preselected rate and means for rotating said specimens at a preselected rate, said spacing between adjacent ultrasonic transducers and the preselected rate of relative movement and rotation of each of said specimens being such that each of said ultrasonic transducers inspects substantially separate helical paths each extending the length of said specimens and such that the convolutions of each said helical path are intermediate the convolutions of the other of said helical paths in such a manner that the entire specimen is inspected.

3. The apparatus recited in claim 2 wherein said transducers are arranged at an angle to the surface of said specimens such that the ultrasonic pulses from said transducers are propagated as shear waves around said specimens.

4. The apparatus recited in claim 3 including means for supplying energy to said ultrasonic transducers, means for receiving flaw-revealing signals from said ultrasonic transducers and gate means for selecting only a portion of the flaw-revealing signals for use in the inspection.

5. The apparatus recited in claim 4 wherein at least one of said plurality of ultrasonic transducers is oriented so as to propagate shear waves in one direction around said specimens and at least another of said plurality of ultrasonic transducers is oriented so as to propagate shear waves in the opposite direction around said specimens.

6. The apparatus recited in claim 5 further including means to apply a fluid coupling material to said specimens prior to said inspecting units.

7. The method of testing elongated specimens for the presence of flaws therein comprising the steps of establishing a path of travel for said specimens, disposing a plurality of ultrasonic search units at predetermined spaced points along said path of travel, imparting ultrasonic energy to each of said units whereby each unit will impart ultrasonic energy to separate spaced portions of said specimens, advancing said specimens along said path of travel, rotating said specimens as they are advanced, the spacing of adjacent units and the rate of advance and rotation of said specimens being selected so that each of said plurality of search units will search a substantially different helical path extending the length of said specimens and so that the convolutions of each said helical path are intermediate the convolutions of the other of said helical paths in such a manner that the entire specimen is inspected.

8. The method of claim 7 wherein said plurality of search units are arranged at an angle to the surface of said specimens such that the ultrasonic energy will be propagated as shear waves around said specimens.

9. The method of claim 8 wherein at least one of said search units is arranged to propagate shear waves in one direction around said specimens and at least another is arranged to propagate shear waves in the opposite direction around said specimens.

References Cited

UNITED STATES PATENTS

| 2,883,860 | 4/1959 | Henry | 73—67.9 |
| 2,984,098 | 5/1961 | Loos | 73—67.9 |
| 3,183,709 | 5/1965 | Rankin et al. | 73—67.5 |
| 3,224,254 | 12/1965 | Loving | 73—67.8 X |
| 3,228,233 | 1/1966 | Keldenich | 73—67.8 |
| 3,274,822 | 9/1966 | Stanya | 73—67.9 |
| 3,285,059 | 11/1966 | Bogle | 73—67.9 |

OTHER REFERENCES

An article from Nondestructive Testing, October 1961, pp. 353–4.

JAMES J. GILL, *Primary Examiner.*